US008584090B2

(12) United States Patent
Salehi et al.

(10) Patent No.: US 8,584,090 B2
(45) Date of Patent: Nov. 12, 2013

(54) HEURISTIC APPROACH ON CHECKING SERVICE INSTANCE PROTECTION FOR AVAILABILITY MANAGEMENT FRAMEWORK (AMF) CONFIGURATIONS

(75) Inventors: Pejman Salehi, Montreal (CA); Maria Toeroe, Montreal (CA); Ferhat Khendek, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 432 days.

(21) Appl. No.: 13/083,243

(22) Filed: Apr. 8, 2011

(65) Prior Publication Data

US 2012/0192157 A1 Jul. 26, 2012

Related U.S. Application Data

(60) Provisional application No. 61/434,635, filed on Jan. 20, 2011.

(51) Int. Cl.
*G06F 9/44* (2006.01)
*G06F 9/46* (2006.01)

(52) U.S. Cl.
USPC ........... 717/124; 717/126; 717/120; 717/121; 718/104

(58) Field of Classification Search
None
See application file for complete search history.

(56) References Cited

U.S. PATENT DOCUMENTS

| 6,865,524 | B1 * | 3/2005 | Shah et al. ...................... 703/13 |
| 7,039,654 | B1 * | 5/2006 | Eder .................................... 1/1 |
| 2010/0235479 | A1 * | 9/2010 | Toeroe .......................... 709/221 |
| 2011/0019594 | A1 * | 1/2011 | Lesaint et al. ................ 370/271 |
| 2011/0270595 | A1 * | 11/2011 | Salehi et al. ...................... 703/6 |
| 2012/0030650 | A1 * | 2/2012 | Ravindran et al. ............ 717/107 |

OTHER PUBLICATIONS

Patt-Shamir et al., "Vector Bin Packing with Multiple-Choice", in Proc. the 12th Scandinavian Symposium and Workshops on Algorithm Theory (SWAT), 2010.*
Gherbi et al., "Capturing and Formalizing SAF Availability Management Framework Configuration Requirements,"Jun. 5, 2009.*
Kanso et al., "Automatic Generation of AMF Compliant Configurations," Springer-Verlag Berlin, Heidelberg © 2008.*
Stein at al., "Provisioning Heterogeneous and Unreliable Providers for Service Workflows,"2007.*
Gherbi, "A Tool Suite for the Generation and Validation of Configurations for Software Availability," 2009 IEEE/ACM International Conference on Automated Software Engineering.*

(Continued)

*Primary Examiner* — Insun Kang
(74) *Attorney, Agent, or Firm* — Alex Nicolaescu; Ericsson Canada Inc.

(57) ABSTRACT

A configuration including Service Instances (SIs) and a list of Service Units (SUs) is to be validated. The SIs are to be allocated to the SUs for protection of the service represented by the SIs. A set of heuristics is applied to determine whether, for each of the SI assignments, the SI can be allocated to one of the SUs whose capacities support the required capacities of the SI. The heuristic then walks the list in order, to find a first SU that supports a current SI. If none of the SUs in the list can support the current SI, the heuristic indicates that the configuration is not validated. In response to a result that at least one of the heuristics in the set indicates the SUs can support all of the SIs, a final result is generated indicating that the configuration is valid.

20 Claims, 11 Drawing Sheets

(56) References Cited

OTHER PUBLICATIONS

Salehi et al., "Checking Service Instance Protection for AMF Configurations," 2009 Third IEEE International Conference on Secure Software Integration and Reliability Improvement.*

Kansol et al., "Generating AMF Configurations from Software Vendor Constraints and User Requirements," 2009 International Conference on Availability, Reliability and Security.*

Service Availability Forum, Application Interface Specification, Availability Management Framework, SAI-AIS-AMF-B.04.01, Feb. 2010, pp. 1-452.

E.G. Coffman et al., Approximation Algorithms for Bin Packing: a Survey, Approximation Algorithms for NP-Hard Problems, PWS Publishing, Boston 1996, pp. 1-53.

* cited by examiner

FIRST FIT HEURISTIC

ORDER-BASED HEURISTIC (BEST/WORST FIT)

AN EXAMPLE OF INCREMENTAL CONFIGURATION
USING BEST FIT HEURISTIC
WITH RELATIVE CAPACITY CRITERION

CONFIGURATION VALIDATION

INCREMENTAL CONFIGURATION

N+M REDUNDANCY MODEL

N-WAY-ACTIVE REDUNDANCY MODEL

N-WAY REDUNDANCY MODEL

US 8,584,090 B2

HEURISTIC APPROACH ON CHECKING SERVICE INSTANCE PROTECTION FOR AVAILABILITY MANAGEMENT FRAMEWORK (AMF) CONFIGURATIONS

CROSS-REFERENCE TO RELATED APPLICATIONS

This application claims the benefit of U.S. Provisional Application No. 61/434,635, filed Jan. 20, 2011, which is hereby incorporated by reference.

FIELD

Embodiments of the invention relate to the field of availability management framework (AMF) configuration validation.

BACKGROUND

The Service Availability™ (SA) Forum has developed standard interfaces to enable the delivery of highly available carrier-grade systems with off-the-shelf platforms, middleware and service applications. Implementation of the standards allows software developers to focus on the application code that provides mission-critical services, and to minimize the need for customized high availability programming.

FIG. 1 is a conceptual architecture stack defined by the SA forum for a highly available (HA) system. The SA forum has developed the Application Interface Specification (AIS) 120 to provide a standardized interface between HA applications 110 and HA middleware 130, such that they can be independent of one another. The HA applications 110 and the HA middleware 130 are run on an operating system 140 and are hosted by a hardware platform 150. Service continuity is achieved with the cooperation of all of the components in the stack. As part of the AIS 120, the SA forum has also developed a specification for the Availability Management Framework (AMF) 125 to coordinate and manage service availability in an HA system (*SA Forum, Application Interface Specification, Availability Management Framework SAI-AIS-AMF-B*.04.01). An AMF configuration, which is a configuration compliant with the AMF specification, is a logical organization of resources for providing and protecting services for a given HA application. An AMF configuration consists of components grouped into service units (SUs), which are further grouped into services groups (SGs). An application may consist of one or several SGs to provide and protect services. The services are defined in terms of service instances (SIs) composed of component service instances (CSIs). At runtime, for each SI, the middleware implementing the AMF service assigns active and standby HA states to SUs, according to a redundancy model used by the HA system. The AMF specification defines five redundancy models, which include the No-Redundancy, 2N, N+M, N-Way-Active and N-Way redundancy models.

Several approaches are devised for generating valid AMF configurations. The design of the AMF configuration is driven by the required service and the specified redundancy model. Some of the approaches systematically generate AMF configurations that ensure SI protection: for example, components are created to provide and protect requested CSIs, and SUs are defined to provide and protect required SIs. In addition, the SUs are grouped into SGs with the redundancy model requested by the designer. However, when configurations are designed in an ad hoc manner, there can be a question of whether the configurations ensure SI protection. In some situations, new or additional services may be requested after a configuration is generated. In these situations, there can be a question of whether the current configuration provides and protects all the services (including the new/additional services).

AMF configurations created by designers using traditional tools also need to be validated. Validating the protection of services as requested may require the exploration of all possible SI combinations and SI-SU assignments. This is a combinatorial and complex problem. In general, the problem is NP-hard for the N+M, N-Way-Active, and N-Way redundancy models.

SUMMARY

According to one embodiment of the invention, a method is implemented in a computer system for validating a configuration, according to which a plurality of Service Instances (SIs) are to be allocated to a list of Service Units (SUs). The list of SUs composes a service group (SG) for the protection of the service(s) represented by the SIs. Each of the SUs represents a collection of hardware and/or software components capable of providing services. The type and the units of a service that a component can provide is described as a component service type. Accordingly, each of the SUs has k capacities $<c_1, \ldots, c_k>$ for each of k component service types (CSTypes), k being an integer greater than one. Each of the SIs represents a collection of workloads of particular component service types therefore each of the SIs has k required capacities $<r_1, \ldots, r_k>$ for each of the k CSTypes. To provide the protection, each of the SIs is assigned to one or more SUs of the SG (i.e., each SI has one or more assignments) as required by the redundancy model of the SG. The method comprises the step of: applying a set of one or more heuristics to determine whether, for each of the SI assignments, one of the SUs whose capacities $<c_1, \ldots, c_k>$ support the required capacities $<r_1, \ldots, r_k>$ of the SI. The heuristics include at least an order-based heuristic. For the order-based heuristic, the step of applying further comprises the steps of: determining a set of one or more of the k CSTypes to be used as a sorting criterion and sorting the SUs for each of the SIs based on the determined set of CSTypes each time before the list of SUs is checked for service protection. The step of applying further comprises the steps of: walking the list in order, to find a first of the SUs that supports a current one of the SIs to be allocated, wherein, for each CSType, the capacity of the first SU is greater than or equal to the required capacity of the current SI of that CSType; if the first SU is found in the list, updating the capacities of the first SU to remove the required capacities of the current SI from the provided capacities of the first SU; and if none of the SUs in the list can support the current SI, indicating that the configuration is not validated. Finally, in response to a result that at least one of the heuristics in the set indicates the SUs can support all of the SIs for all of their required assignments, the method comprises the step of generating a result indicating that the configuration is valid.

According to another embodiment of the invention, a computer system is adapted to validate a configuration, according to which a plurality of SIs are to be allocated to a list of SUs. The list of SUs composes a service group (SG) for the protection of the service(s) represented by the SIs. Each of the SUs represents a collection of hardware and/or software components capable of providing services. The type and the units of a service that a component can provide is described as a component service type. Accordingly, each of the SUs has k capacities $<c_1, \ldots, c_k>$ for each of k component service types (CSTypes), k being an integer greater than one. Each of the SIs represents a collection of workloads of particular component service types therefore each of the SIs has k required capacities $<r_1, \ldots, r_k>$ for each of the k CSTypes. To provide the protection, each of the SIs is assigned to one or more SUs of the SG (i.e., each SI has one or more assignments) as required by the redundancy model of the SG. The computer system comprises: a processor coupled to a non-transitory computer readable storage medium, the non-transitory computer readable storage medium having stored therein an availability management framework (AMF) service module adapted to apply a set of one or more heuristics to determine whether, for each of the SI assignments, the SI can be allocated to one of the SUs whose capacities $<c_1, \ldots, c_k>$ support the required capacities $(r_1, \ldots, r_k)$ of the SI. The heuristics include at least an order-based heuristic. For the order-based heuristic, the AMF module is adapted to determine a set of one or more of the k CSTypes to be used as a sorting criterion and sort the SUs for each of the SIs based on the determined set of CSTypes. The AMF module is further adapted to walk the list in order, to find a first of the SUs that supports a current one of the SIs to be allocated, wherein, for each CSType, the capacity of the first SU is greater than or equal to the required capacity of the current SI of that CSType. If the first SU is found in the list, the AMF module is adapted to update the capacities of the first SU to remove the required capacities of the current SI from the provided capacities of the first SU. If none of the SUs in the list can support the current SI, the AMF module is adapted to indicate that the configuration is not validated. Finally, in response to a result that at least one of the heuristics in the set indicates the SUs can support all of the SIs for all of their required assignments, the AMF module is adapted to generate a result indicating that the configuration is valid.

According to yet another embodiment of the invention, a non-transitory computer readable storage medium includes instructions that, when executed by a computer system, cause the computer system to perform a method of validating a configuration, according to which a plurality of SIs are to be allocated to a list of SUs. The list of SUs composes a SG for the protection of the service(s) represented by the SIs. Each of the SUs represents a collection of hardware and/or software components capable of providing services. The type and the units of a service that a component can provide is described as a component service type. Accordingly, each of the SUs has k capacities $<c_1, \ldots, c_k>$ for each of k component service types (CSTypes), k being an integer greater than one. Each of the SIs represents a collection of workloads of particular component service types therefore each of the SIs has k required capacities $<r_1, \ldots, r_k>$ for each of the k CSTypes. To provide the protection, each of the SIs is assigned to one or more SUs of the SG (i.e., each SI has one or more assignments) as required by the redundancy model of the SG. The method comprises the step of: applying a set of one or more heuristics to determine whether, for each of the SI assignments, the SI can be allocated to one of the SUs whose capacities $<c_1, \ldots, c_k>$ support the required capacities $<r_1, \ldots, r_k>$ of the SI. The heuristics include at least an order-based heuristic. For the order-based heuristic, the step of applying further comprises the steps of: determining a set of one or more of the k CSTypes to be used as a sorting criterion and sorting the SUs for each of the SIs based on the determined set of CSTypes each time before the list of SUs is checked for service protection. The step of applying further comprises the steps of: walking the list in order, to find a first of the SUs that supports a current one of the SIs to be allocated, wherein, for each CSType, the capacity of the first SU is greater than or equal to the required capacity of the current SI of that CSType; if the first SU is found in the list, updating the capacities of the first SU to remove the required capacities of the current SI from the provided capacities of the first SU; and if none of the SUs in the list can support the current SI, indicating that the configuration is not validated. Finally, in response to a result that at least one of the heuristics in the set indicates the SUs can support all of the SIs for all of their required assignments, the method comprises the step of generating a result indicating that the configuration is valid.

BRIEF DESCRIPTION OF THE DRAWINGS

The invention may best be understood by referring to the following description and accompanying drawings that are used to illustrate embodiments of the invention. In the drawings.

DETAILED DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention can be applied to a configuration of an SG (which contains a number of SUs) to determine whether the configuration protects SIs for the N+M, N-Way and N-Way-Active redundancy models. The validation uses a number of heuristics that has lower complexity than the combinatorial approaches, which are N-P hard. In addition, invalid configuration can be reconfigured to increase capacity and to provide the needed protection for the SIs.

Figure 1:
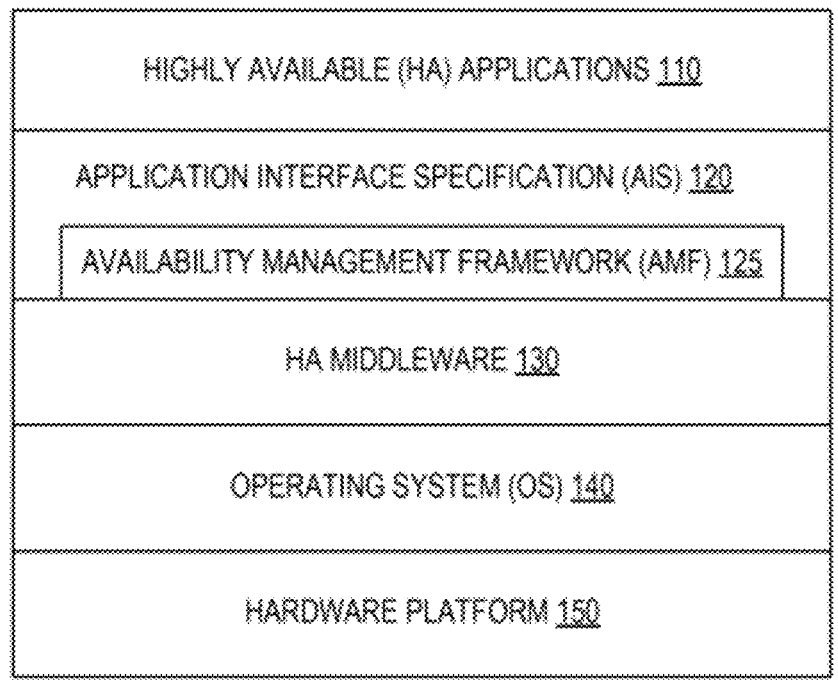
FIG. 1 is a schematic diagram of a highly available (HA) system that uses an Availability Management Framework (AMF) according to the prior art.
Figure 2:
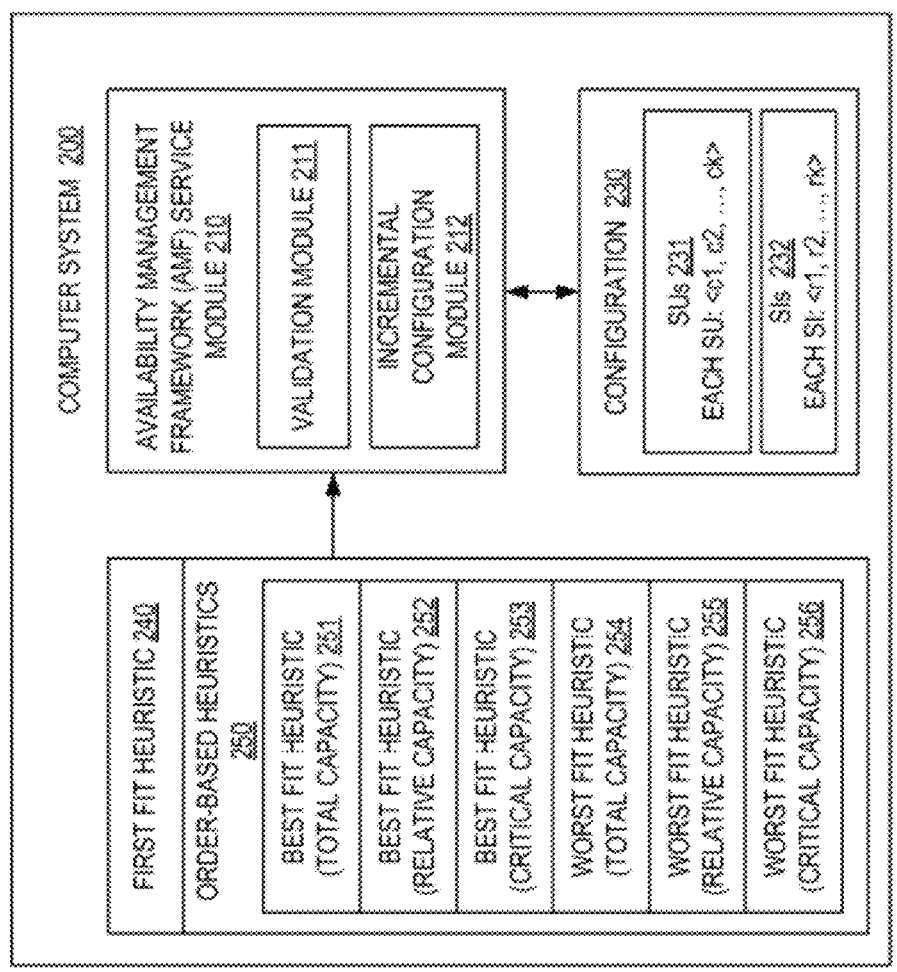
FIG. 2 illustrates a computer system in which embodiments of the invention may be implemented.

FIG. 2 illustrates an embodiment of a computer system 200 in which an AMF service module 210 is deployed to manage service availability of a network service provider's system. In one embodiment, the computer system 200 includes a number of server computers, and the AMF service module 210 may be distributed among one or more of the server computers. In one embodiment, the computer system 200 may host multiple virtual machines (VMs), one or more of which may host the AMF service module 210. In one embodiment, the computer system 200 may be part of the network service provider's system, and one or more of the VMs may run the services provided by the network service provider to its subscribers.

In one embodiment, the AMF service module 210 includes a validation module 211, which validates a configuration of a group of SUs for a given set of SIs. The SUs represents a collection of hardware and/or software components capable of providing services. Each of the SIs represents a collection of workload. In one embodiment, the validation module 211 receives a configuration 230 (e.g., an AMF configuration) including a group of SUs 231 and a set of SIs 232 as input, performs validation operations using a number of heuristics, and output a result indicating whether the SUs 231 can support the SIs 232 (i.e., the configuration is valid) or cannot support the SIs 232 (i.e., the configuration is not validated). In one embodiment, the set of heuristics includes a First-Fit heuristic 240 and order-based heuristics 250, such as: a Best-Fit heuristic with total capacity 251, a Best-Fit heuristic with relative capacity 252, a Best-Fit heuristic with critical capacity 253, a Worst-Fit heuristic with total capacity 254, a Worst-Fit heuristic with relative capacity 255 and a Worst-Fit heuristic with critical capacity 256. In some embodiments, when none of the SUs 231 can support a given SI with its remaining capacity, an incremental configuration module 212 can add an SU to support the given SI. Operations of the incremental configuration will be described in further detail with references to FIGS. 4-6, 7A and 7B. In some embodiments, the configuration to be validated is modeled according to a redundancy model (e.g., the N+M Redundancy Model, the N-Way-Active Redundancy Mode, or the N-Way Redundancy Mode), in which each SI may have multiple "assignments." Each assignment of an SI can be a standby assignment or an active assignment, and is to be allocated to an SU that supports the assignment. The multiple assignments of an SI are to be allocated to different SUs to provide redundancy protection. Validation of a configuration according the redundancy models will be described in further detail with reference to FIGS. 8-10.

In the following, the problem of SI protection is presented and a number of solutions are described. Allocation of SIs to a given set of SUs is an extension to a conventional bin-packing problem (e.g., E. Coffman, M Garey, D. Johnson, "*Approximation heuristics for bin packing: A survey*", *Approximation Heuristics for NP-hard Problems*, pp. 46-89, PWS Publishing Company, 1995), in which objects of different volumes are packed into a finite number of bins of capacity n in a way that minimizes the number of bins used. In the case of the SI protection problem, the SUs can be considered as bins and the SIs as the objects. The capacities provided by each SU and required by each SI are described in terms of the number of the CSIs (each CSI representing a unit of workload) of a certain CSType. Each CSType represents a type of service, a function a software or hardware component may provide to other components or to the external world. Examples are a broadband service, a telephone service, a TV service, a database lookup, an authentication service, a dispatch function, etc. The SI protection problem extends the conventional bin-packing problem to a general problem in which the capacity of bins and the size of objects are an ordered set of k values (where k is an integer greater than or equal to one) instead of a single value. The conventional bin-packing problem, in general, is NP-hard.

SI Protection Problem:

Assume that there are a fixed number n of Service Units (SUs) denoted by SUList=$\{SU_1, \ldots SU_n\}$. Each SU combines a group of components capable of supporting multiple different CSTypes (i.e. capable of providing the CSIs of those CSTypes). Let k denote the total number of the CSTypes supported by the SUs of the SUList. Therefore, the provided capacity list for $SU_i$ is defined as an ordered list $<c_i, \ldots c_k>$ in which $c_i \geq 0$ is an integer representing the capacity of the SU that provides the CSIs from the $CSType_i$.

Additionally, there is a list of m SIs, denoted by SIList=$\{SI_1, \ldots SI_m\}$. Similar to the provided capacity list of SUs, for each $SI_j \in$SIList, the required capacity list is defined by an ordered set $\langle (r_1^j, \ldots, r_k^j \rangle$ determining the required capacity of the $SI_j$ for each CSType. An SI ($SI_j$) can be assigned to an SU ($SU_i$) if and only if the remaining capacity of $SU_i$ for each of the CSTypes is not less than the capacity required by $SI_j$ for that CSType. The goal is to verify whether all of the SIs can be allocated to the given SUs taking also into account the redundancy model used to protect the SIs.

Solution:

Embodiments of the invention provide multiple heuristics, each of which verifies whether all of the SIs can be allocated to the given set of SUs for protection according to the redundancy model. If a heuristic succeeds in allocating all SIs with all their required assignments to the SUs, the answer to the problem is "Yes." If it fails, the answer could be "Yes" or "No." All of these heuristics get a sequence of the SIs and allocate them one by one. A heuristic answers "No" if it fails to allocate an SI at a certain point (which may result in a False Negative). When all of the SIs are successfully allocated to the SUs, the heuristic returns "Yes" as the output. To obtain results with improved accuracy, embodiments of the invention apply all of the heuristics to the SI sequence and then compute a binary OR of the answers. The heuristics may be applied in parallel or sequentially. If all the heuristics produce the "No" answer, the method also produces a "No" answer to the problem. Since these heuristics are different from each other and some of them apply opposite sorting orders, the chances of acquiring False Negatives are greatly reduced.

An embodiment of a generalized method is described below with reference to FIG. 3, and details are provided with reference to FIGS. 4-6, 7A, 7B and 10.

Figure 3:
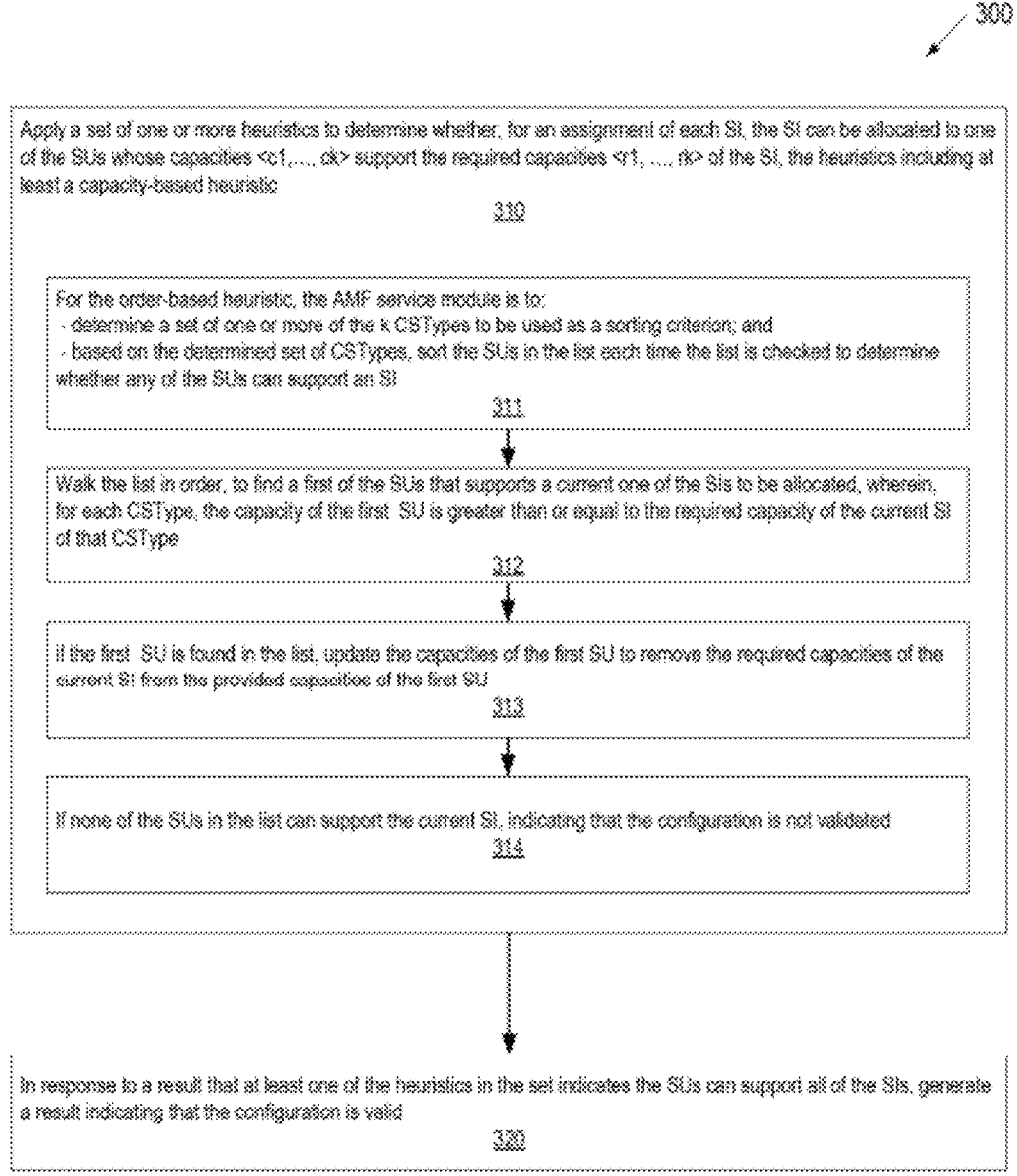
FIG. 3 is a flow diagram illustrating a method of validating a configuration according to one embodiment of the invention.

FIG. 3 is a flow diagram illustrating a method 300 for validating a configuration according to embodiments of the invention. The method 300 may be performed by hardware (e.g., circuitry, dedicated logic, programmable logic, microcode, etc.), software (e.g., instructions run on a processing device), or a combination thereof. In one embodiment, the method 300 is performed by the computer system 200 of FIG. 2, which includes one or more server computers each of which may have the hardware shown in a computer system 1100 of FIG. 11.

Referring to FIG. 3, in one embodiment, the method 300 begins with the AMF service module 210 (of FIG. 2) applying a set of one or more heuristics to determine, for each of the SI assignments as required by a redundancy model, whether the SI can be allocated to one of the SUs whose capacities $<c_1, \ldots, c_k>$ support the required capacities $<r_1, \ldots, r_k>$ of the SI (block 310). The heuristics include at least an order-based heuristic. For the order-based heuristic, the AMF service module 210 determines a set of one or more of the k CSTypes to be used as a sorting criterion and sorts the SUs for each of the SIs based on the determined set of CSTypes (block 311). The AMF service module 210 walks the list in order, to find a first of the SUs that supports a current one of the SIs to be allocated (block 312). An SU supports the current SI if, for each CSType, the capacity of the SU is greater than or equal to the required capacity of the current SI of that CSType. If such a first SU is found in the list, the AMF service module 210 updates the capacities of the first SU to remove the required capacities of the current SI from the provided capacities of the first SU (block 313). If none of the SUs in the list can support the current SI, the AMF service module 210 indicates that the configuration is not validated (block 314). In one embodiment, the operations of blocks 310-314 are performed for each assignment of an SI as required by the redundancy model, making sure that no SU is selected twice for assignments of the same SI. Finally, in response to a result that at least one of the heuristics in the set indicates the SUs can support all of the SIs, the AMF service module 210 generates a result indicating that the configuration is valid (block 320).

In the following, seven heuristics are described. It is understood that when solving the SI protection problem, additional heuristics or fewer heuristics may be applied. To begin with, these heuristics are presented considering only one assignment per SI. Subsequently, it is described how these heuristics can be tailored to the different redundancy models considering the possibility of multiple assignments for each SI.

First-Fit Heuristic (FF):

In one embodiment, one of the heuristics is the First-Fit heuristic (FF), where a fixed order of the SUs is preserved in the SUList during the whole run of the heuristic. To allocate a given SI to an SU, the heuristic walks the SUList in the fixed order to find the first available SU that supports the SI for all of the CSTypes.

Complexity: The allocation of each SI to each SU can be achieved with k comparisons between the provided and required capacities of the SUs and the SIs; moreover, the number of the SUs that need to be checked before finding the appropriate one can be n, at most. Considering the number of allocations which equals the number of SIs (m), the complexity of this approach is m×n×k in the worst case.

Figure 4:
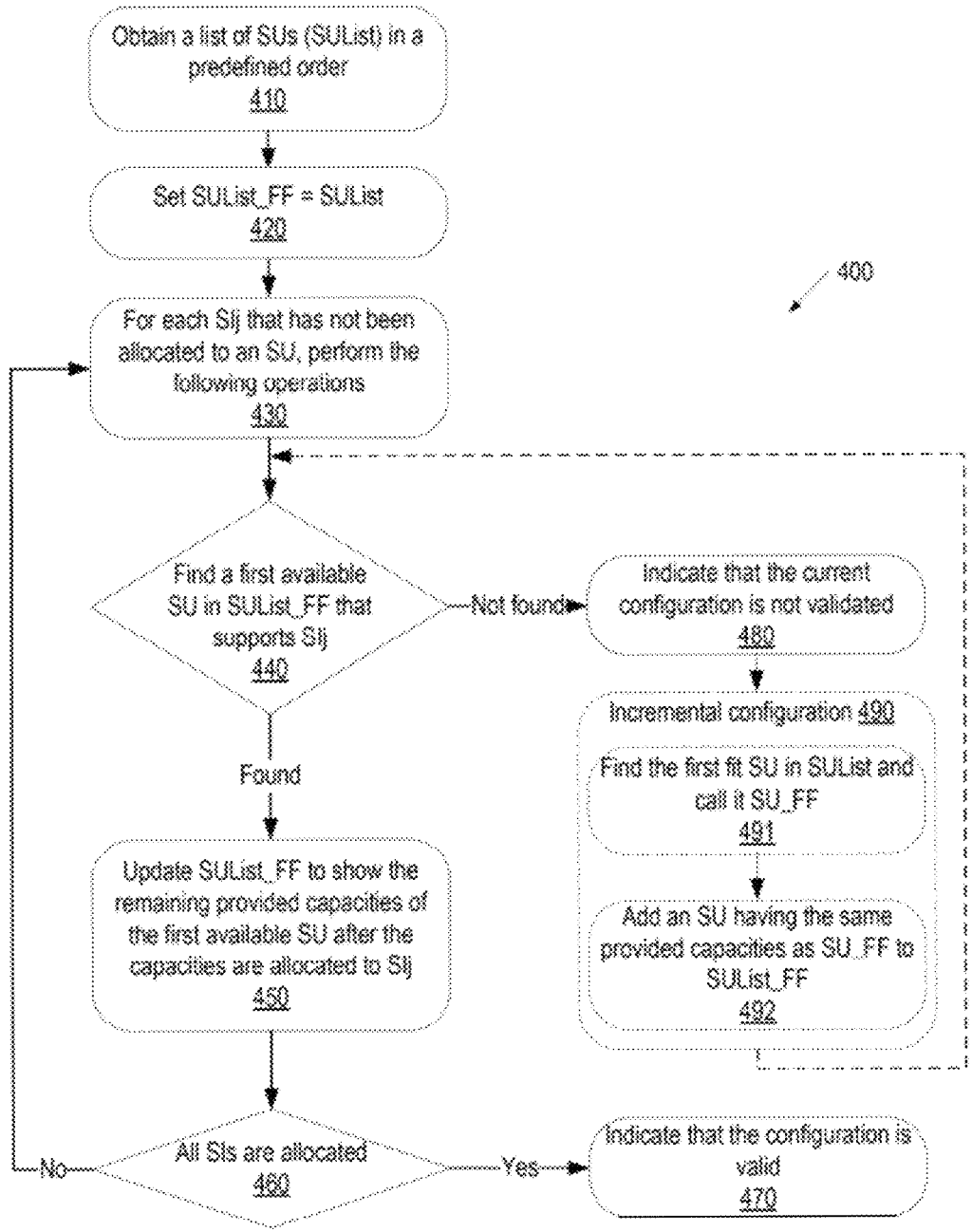
FIG. 4 is a flow diagram illustrating a method of validating a configuration with a First Fit heuristic according to one embodiment of the invention.

FIG. 4 is a flow diagram illustrating a method 400 for the First-Fit heuristic according to embodiments of the invention. The method 400 may be performed by hardware (e.g., circuitry, dedicated logic, programmable logic, microcode, etc.), software (e.g., instructions run on a processing device), or a combination thereof. In one embodiment, the method 400 is performed by the computer system 200 of FIG. 2, which includes one or more server computers each of which may have the hardware shown in a computer system 1100 of FIG. 11.

Referring to FIG. 4, in one embodiment, the method 400 begins with the AMF service module 210 (of FIG. 2) obtaining a list of SUs (SUList) in a given configuration (block 410). The AMF service module 210 sets a working list (SUList_FF) equal to the SUList (block 420). For each $SI_j$ (in the given configuration) that has not been allocated to an SU, the AMF service module 210 performs the following operations (block 430). First, the AMF service module 210 finds a first available SU in SUList_FF that supports (i.e., fits) $SI_j$ (block 440). If such SU can be found, the provided capacities of that SU are allocated to $SI_j$, and the SUList_FF is updated to show the remaining provided capacities of that SU (block 450). The AMF service module 210 checks whether there is any unallocated SI (block 460). If all of the SIs are allocated, the AMF service module 210 generates a result indicating that the configuration is valid (block 470). This result is also the final validation result for the configuration.

If such SU cannot be found at block 440, the AMF service module 210 indicates that the configuration is not validated (block 480). In one embodiment, the AMF service module 210 may generate a result (e.g., "No") indicating that the configuration is not validated by the First-Fit heuristic. This result will be considered with other results generated by the other heuristics to generate a final validation result for the configuration.

In an alternative embodiment, when it is shown that the configuration is not validated, the AMF service module 210 may perform an incremental configuration to add more capacities that can be provided to the SIs (block 490). In this alternative embodiment, the AMF service module 210 finds a first fit SU (i.e., the first available SU that supports $SI_j$ according to the First-Fit heuristic) in SUList (i.e., the SUList at block 420 that has not been updated by the operation of block 450) (block 491). In an embodiment compliant with the AMF requirement, all of the SUs in the initial list (SUList) must be capable of supporting any one of the SIs. Thus, the first-fit SU is the first SU in the SUList. This first-fit SU is referred to as SU_FF. The AMF service module 210 then adds an SU having the same provided capacities as SU_FF to SUList_FF (block 492). The method 400 then proceeds to block 440, which uses the just-added SU that was as the first available SU in SUList_FF that supports $SI_j$. The method 400 continues until all of the SIs are allocated (block 460).

Best-Fit Heuristic (BF):

In one embodiment, one of the heuristics is the Best-Fit heuristic, which sorts SUs in an increasing order of remaining capacities, and finds the first SU that supports (i.e., fits) a given SI. Therefore, a given SI assignment is allocated to an SU which has the minimum remaining capacity among those who have enough capacity for the given SI. The list of SUs is sorted after each allocation of an SI. With the Best-Fit heuristic, the goal is to exhaust an SU as much as possible before moving to another SU. Since there is no single value defined as the "capacity" of each SU (as the provided capacity is represented through a list of non-negative integers), the heuristics use the following sorting criteria to sort the SUs. The Best-Fit heuristic, with the three criteria to be described below, can be considered as three heuristics.

Total Capacity:

Given the remaining capacity list ($<c_i, \ldots, c_k>$) for a given SU ($SU_i$), the total capacity is the sum of the remaining capacities of all supported CSTypes in $SU_i$, where $$\left(\text{total capacity of } SU_i = \sum_{t=1}^{k} c_t^i\right).$$

As an example, assume that there are three SUs ($SU_1, SU_2, SU_3$) supporting three different CSTypes. The remaining capacity lists of the SUs are $<4,2,1>$, $<1,1,1>$, and $<2,4,0>$, respectively. On the service side, there are two unallocated SIs ($SI_1, SI_2$) with the required capacity lists of $<1,2,0>$ and $<3,2,1>$, respectively. The capacities of the three SUs, according to the total capacity criterion, are 7, 3, and 6, respectively.

Thus, the sorted list of the SUs is {$SU_2$,$SU_3$,$SU_1$}. It is worth noting that the sorted list of the SUs for both SIs is the same, as in this example the criterion is calculated independently of the SIs.

Complexity: Sorting the SUList can be achieved in 0(n log n) and keeping it sorted, in 0(log n). For each SI, at most all n SUs in the SUList are examined in order to find the proper SU (which can be done through n×k comparisons). In addition, after the successful allocation of an SI, the SUList are re-sorted in 0(log n). As a result, the complexity of this heuristic is m×(n×k+0(log n))+0(n log n).

Relative Capacity:

For a given SU, this criterion is defined with respect to a specific SI and is based on the largest member of the required capacity list of each SI. As a result, for each SI the sorted list of the SUs may differ. For a given SI ($SI_j$) with the capacity list of $\langle r_1^j, \ldots, r_k^j \rangle$, the index of the largest member of the required capacity list is: $t=\text{argmax}(\langle (r_1^j, \ldots r_k^j) \rangle)$, wherein argmax stands for the argument of the maximum; that is, in $SI_j$, t is the index for which the value of $r_t$ (which is the number of CSIs of $CSType_t$) is larger than the value of any other element of $\langle r_1^j, \ldots, r_k^j \rangle$ (which is the number of CSIs of the other CSTypes). Consequently, for $SI_j$, the SUList is sorted based on the $c_t$ of each SU (e.g. $c_t^i$ for $SU_i$).

Considering the aforementioned example, the largest required capacities of $SI_1$ and $SI_2$ are 2 and 3, at indices 2 and 1 respectively. Therefore, the relative capacity criterion for $SI_1$ is $c_2$ for the SUs which results in having the sorted SUList as {$SU_2$,$SU_1$,$SU_3$}. Similarly, $c_1$ is the criterion for $SI_2$ and the sorted SUList is {$SU_2$,$SU_3$,$SU_1$}.

Complexity: The complexity of the relative capacity criterion is very similar to the total capacity criterion. The only difference is due to the fact that the sorted list of SUs is different for each SI and thus, the SUList needs to be sorted for each SI separately. Consequently, the complexity of this approach is m×(n×k+0(n log n)).

Critical Capacity: Similar to the relative capacity, the critical capacity criterion is also defined with respect to a specific SI. Here the goal is to find the most critical CSType for each SI and then sort the list of SUs based on this CSType. The most critical CSType for each SI is the CSType which has the largest required capacity in the SI while having the smallest provided capacity among the SUs in the SUList. To this end, a total capacity vector (which is a k-element vector) of the SUs in the SUList is calculated as vector additions:

$$\langle tc_1, \ldots tc_k \rangle = \sum_{i=1}^{k}(c_1^i, \ldots c_k^i) = \left(\sum_{i=1}^{n}c_1^i, \ldots \sum_{i=1}^{n}c_k^i\right).$$

Thereafter, for a given $SI_j$ with the required capacity list of $\langle r_1^j, \ldots, r_k^j \rangle$, the index of the most critical required capacity is: $t=\arg\max(r_1^j/tc_1, \ldots, r_k^j/tc_k))$. Consequently, for $SI_j$, the SUList is sorted based on the $c_t$ of each SU (e.g. $c_t^i$ for $SU_i$).

Going back to the above example, the total capacity list of the SUList is <7,7,2>. For $SI_1$ based on the calculation $$\left(\left\langle \frac{1}{7}, \frac{2}{7}, \frac{0}{2}\right\rangle\right),$$

the critically require service is $r_2$ and hence the SUList is sorted according to $c_2$ which results in the sorted list as {$SU_2$, $SU_1$,$SU_3$}. With the same calculation the SUList for $SI_2$ is sorted based on $c_3$ as {$SU_3$,$SU_2$,$SU_1$}.

Complexity: The complexity of the critical capacity criterion is the same as the relative capacity criterion, which is m×(n×k+0(n log n)).

Worst-Fit Heuristic (WF):

In one embodiment, one of the heuristics is the Worst-Fit heuristic, which sorts the SUs in an decreasing order of remaining capacities, and finds the first SU that supports (i.e., fits) a given SI. This heuristic uses an approach contrary to the BF heuristic, and occasionally produces positive answers when BF fails. The Worst-Fit heuristic can be used with the same three criteria as described above for sorting the SUs. Thus, the Worst-Fit heuristic, with the three criteria described above, can be considered as three heuristics.

Figure 5:
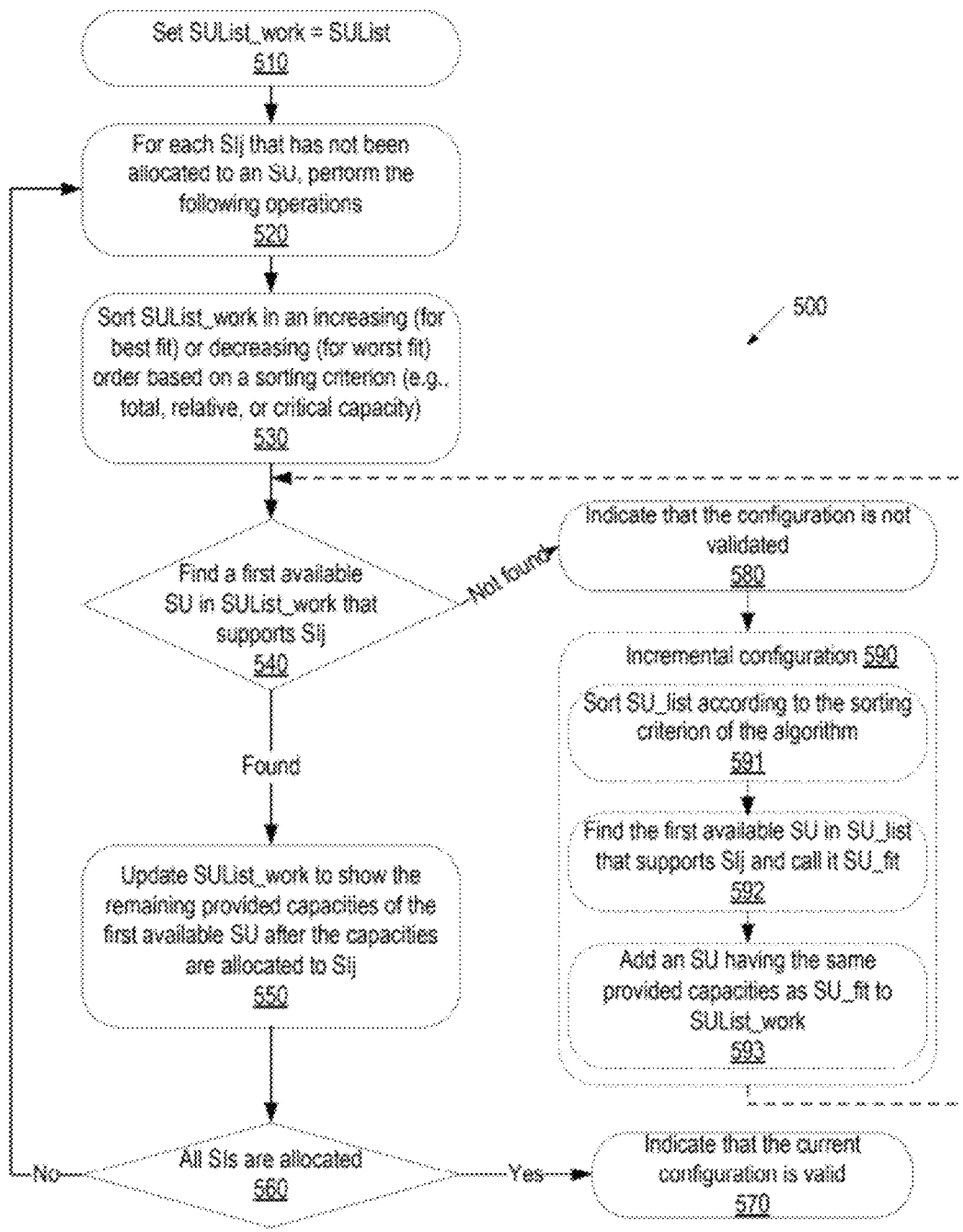
FIG. 5 is a flow diagram illustrating a method of validating a configuration with an order-based heuristic according to one embodiment of the invention.

FIG. 5 is a flow diagram illustrating a method 500 for order-based heuristics (which includes Best-Fit heuristic, Worst-Fit heuristic, and the different criteria defined within each of these heuristics) according to embodiments of the invention. The method 500 may be performed by hardware (e.g., circuitry, dedicated logic, programmable logic, microcode, etc.), software (e.g., instructions run on a processing device), or a combination thereof. In one embodiment, the method 500 is performed by the computer system 200 of FIG. 2, which includes one or more server computers each of which may have the hardware shown in a computer system 1100 of FIG. 11.

Referring to FIG. 5, in one embodiment, the method 500 begins with the AMF service module 210 (of FIG. 2) setting a working list (SUList_work) equal to the SUList, which is the list of all of the SUs in a given configuration (block 510). For each $SI_j$ (in the given configuration) that has not been allocated to an SU, the AMF service module 210 performs the following operations (block 520). First, the AMF service module 210 sorts the SUs in the SUList_work in an increasing (for Best Fit heuristic) or decreasing (for Worst Fit heuristic) order based on a criterion (e.g., total, relative, or critical capacity) (block 530). The AMF service module 210 then finds a first available SU in SUList_work that supports $SI_j$ (block 540). If such SU can be found, the provided capacities of that SU are allocated to $SI_j$, and the SUList_work is updated to show the remaining provided capacities of that SU (block 550). The AMF service module 210 checks whether there is any unallocated SI (block 560). If all of the SIs are allocated, the AMF service module 210 generates a result indicating that the configuration is valid (block 570). This result is also the final validation result for the configuration.

If such SU cannot be found at block 540, the AMF service module 210 indicates that the configuration is not validated (block 580). In one embodiment, the AMF service module 210 may generate a result (e.g., "No") indicating that the configuration is not validated by the current heuristic. This result will be considered with other results generated by the other heuristics to generate a final validation result for the configuration.

In an alternative embodiment, when it is shown that the configuration is not validated, the AMF service module 210 may perform an incremental configuration to add more capacities that can be provided to the SIs (block 590). In this alternative embodiment, the AMF service module 210 sorts the SUList (i.e., the SUList at block 510 that has not been updated by the operation of block 550) according to the same criterion (e.g., total, relative, or critical capacity) of the current heuristic (e.g., Best Fit or Worst Fit heuristic) (block 591). Then the AMF service module 210 finds the first available SU in the sorted SUList that supports $SI_j$ (block 592). In an embodiment compliant with the AMF requirement, the first-available SU is the first SU in the SUList. This SU is referred to as SU_fit. The AMF service module 210 then adds an SU having the same provided capacities as SU_fit to SUList_work (block 593). The method 500 then proceeds to block 540, which uses the just-added SU as the first available SU in SUList_work that supports $SI_j$. The method 500 continues until all of the SIs are allocated (block 560).

Figure 7A:
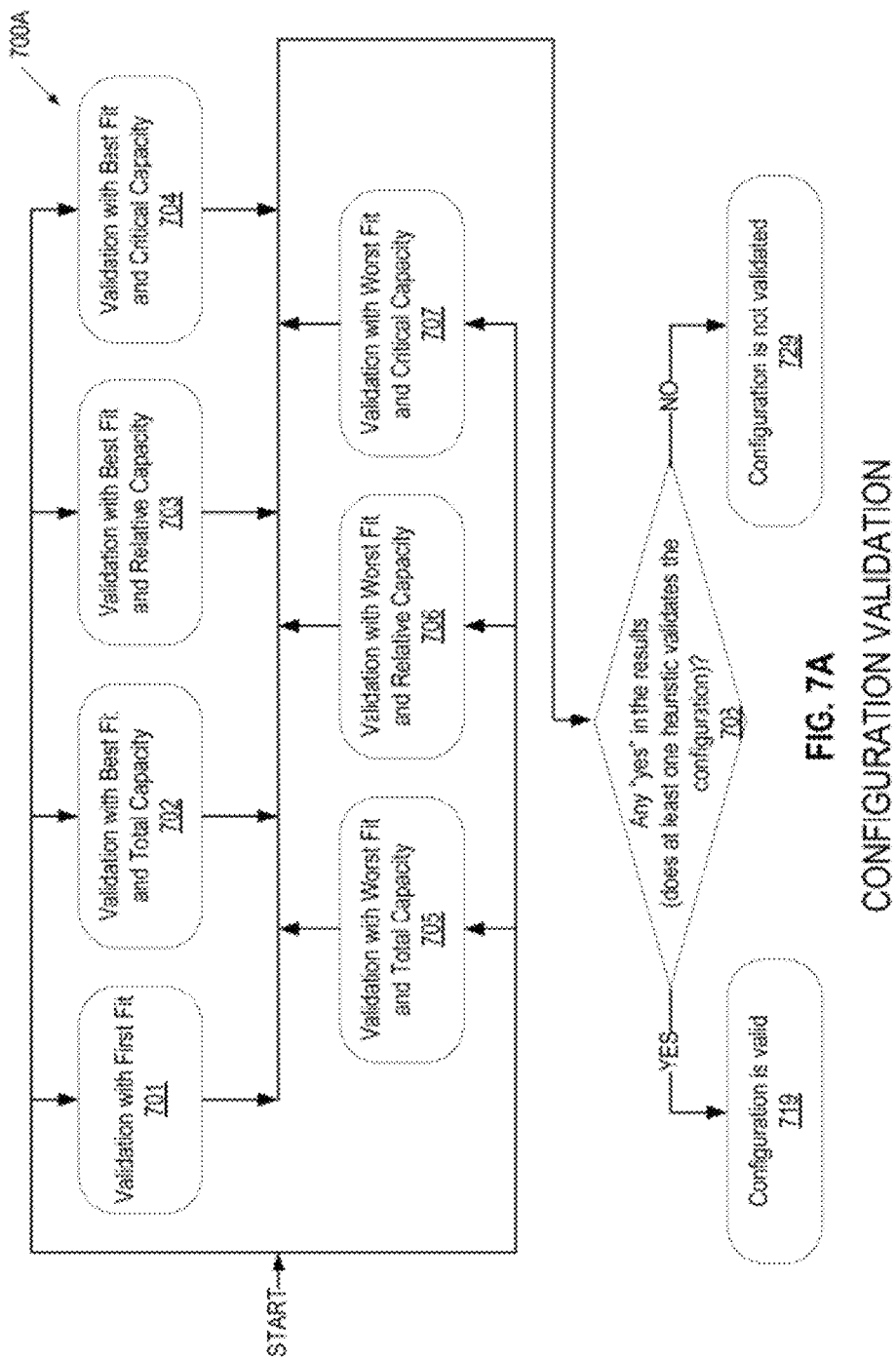
FIG. 7A is a flow diagram illustrating a method of validation of a configuration using multiple heuristics according to one embodiment of the invention.

FIG. 7A presents a validation method 700A according to embodiments of the invention. The method 700A may be performed by hardware (e.g., circuitry, dedicated logic, programmable logic, microcode, etc.), software (e.g., instructions run on a processing device), or a combination thereof. In one embodiment, the method 700A is performed by the computer system 200 of FIG. 2, which includes one or more server computers each of which may have the hardware shown in a computer system 1100 of FIG. 11.

Referring to FIG. 7A, in one embodiment, the method 700A begins with the AMF service module 210 (of FIG. 2) running multiple heuristics in parallel, with a set of SIs and an SG (including a set of SUs represented by an original SUList) as input. The multiple heuristics may include the First-Fit heuristic 701, the Best-Fit heuristics (with total capacity 702, relative capacity 703, and critical capacity 704), and the Worst-Fit heuristics (with total capacity 705, relative capacity 706, and critical capacity 707), all of which perform validation of a given configuration. In an alternative embodiment, the heuristics may be run sequentially in any order. Each of the heuristics produces an answer of either "Yes" or "No," indicating whether the given configuration can be validated by that heuristic. If any of the answer is "Yes" (i.e., at least one of the heuristics validates the configuration) (block 708), it indicates that the configuration is valid and the input SUs can protect the SIs (block 719). If none of the heuristics indicate "Yes," the configuration is not validated (block 729).

With the incremental configuration approach, the additional one or more SUs may be different for each of the heuristics. More specifically, in the BF heuristic, the extra SU(s) for a given SI is (are) identical to the first SU (i.e., the best-fit SU) in the sorted (increasing order) SUList that supports the SI. However, for a given SI in the WF heuristic, the additional SU(s) is (are) identical to the first SU (i.e., the worst-fit SU) in the sorted (decreasing order) SUList that supports the SI. In the FF heuristic, the additional SU(s) is (are) identical to the first-fit SU. In an embodiment complaint with the AMF requirement, the additional one or more SUs may be the same, since any single SU in the original SUList can serve any given SI. In another embodiment, the SU with the largest capacity SU can be always selected to minimize the number of added SUs (even for the BF heuristic). In yet another embodiment, the SU with the maximum allowed capacity for an SU type can be selected. In another embodiment, based on the SU type, the capacity of an existing SU can be increased if the capacity is less than the allowed maximum.

Figure 6:
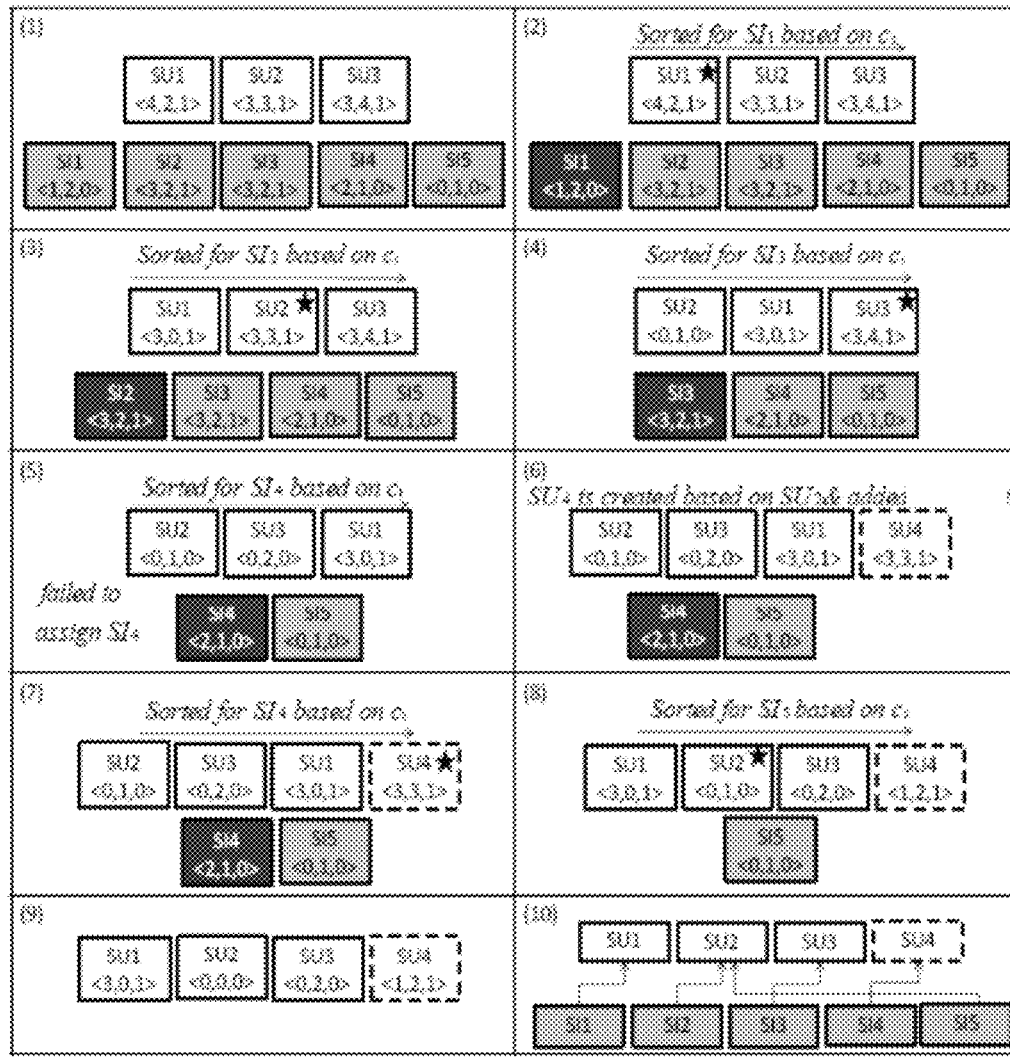
FIG. 6 illustrates an example of incremental configuration using a Best Fit heuristic with a relative capacity criterion.

FIG. 6 is an example for the incremental configuration using the BF heuristic with the relative capacity criterion, according to embodiments of the invention. In addition to the previous two SIs of required capacities <1,2,0> and <3,2,1>, three more SIs, $SI_3$=⟨3,2,1⟩, $SI_4$=⟨2,1,0⟩, and $SI_5$=⟨0,1,0⟩ are included. The SIList becomes {$SI_1$,$SI_2$,$SI_3$,$SI_4$,$SI_5$} with the required capacity list <[<1,2,0>, <3,2,1>, <3,2,1>, <2,1,0>, <0,1,0>], while the SUList remains the same as before: <4,2,1>, <1,1,1>, and <2,4,0>.

FIG. 6 shows the steps of the BF heuristic with the relative capacity criterion. As shown in part (2) of FIG. 6, the original SUList is copied into an SUList_work, and the SUList_work is sorted according to the relative capacity criterion of $SI_1$ (i.e. $c_2$) in an ascending order. Afterwards, the heuristic finds the first SU in the sorted SUList_work which has the adequate capacity to support $SI_1$, $SU_1$ in this case. After the successful allocation of $SI_1$, the heuristic proceeds to $SI_2$ by sorting the SUList_work according to the relative capacity of $SI_2$ and by finding the appropriate SU to support it (part (3) of FIG. 2). As presented in part (4) of FIG. 6, after sorting the SUList_work, the heuristic succeeds in allocating $SI_3$ to $SU_3$. For $SI_4$, after sorting the SUList_work, the heuristic fails to find an appropriate SU capable of supporting $SI_4$ (see part (5)). This means that the current SG configuration (which contains the three SUs) cannot protect the set of SIs configured for it and thus the configuration is "likely" not valid. In this case, the heuristic proceeds by adding an extra SU in order to increase the provided capacity. To do so, the heuristic determines the best-fit SU among the SUs of the original SUList (see part (1) of FIG. 6) and creates an SU with the same capacity, adding it to the SUList_work. As presented in part (6) of FIG. 6, $SU_4$ is created based on the $SU_2$ and is added to the SUList_work in order to support the load of $SI_3$ (see part (7)). The remaining capacity of $SU_2$ is sufficient to support the load of $SI_5$ and therefore it is allocated to $SU_2$ (see part (8) of FIG. 6).

In the last row of FIG. 6, part (9) represents the remaining capacity of the SUList_work after the successful allocation of the entire SIList, and part (10) shows the allocation of each SI to one of the SUs of the augmented SUList_work.

Figure 7B:
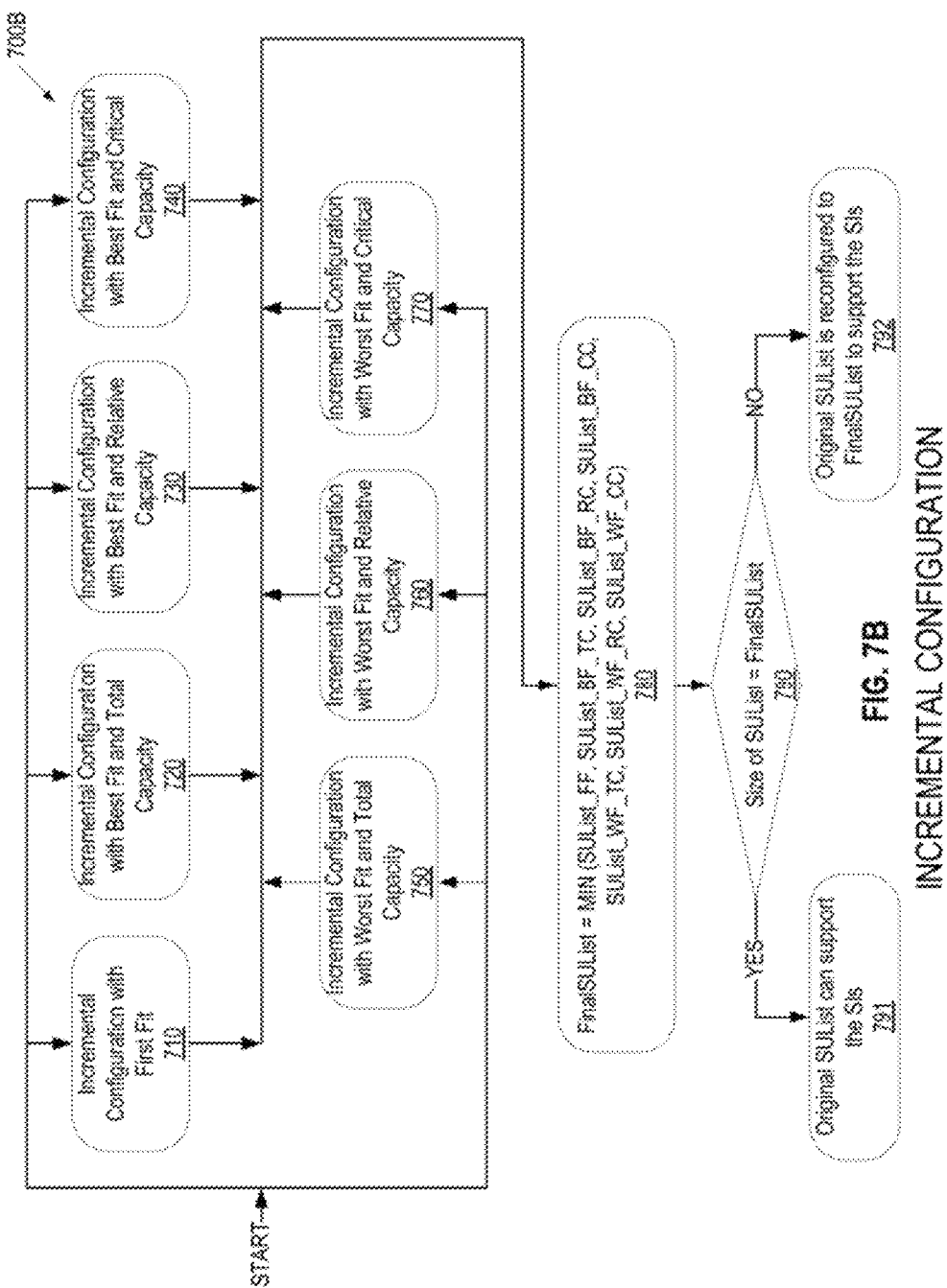
FIG. 7B is a flow diagram illustrating a method of incremental configuration using multiple heuristics according to one embodiment of the invention.

FIG. 7B presents an incremental configuration method 700B according to embodiments of the invention. The method 700B may be performed by hardware (e.g., circuitry, dedicated logic, programmable logic, microcode, etc.), software (e.g., instructions run on a processing device), or a combination thereof. In one embodiment, the method 700B is performed by the computer system 200 of FIG. 2, which includes one or more server computers each of which may have the hardware shown in a computer system 1100 of FIG. 11.

Referring to FIG. 7B, in one embodiment, the method 700B begins with the AMF service module 210 (of FIG. 2) running multiple heuristics in parallel, with a set of SIs and an SG (including a set of SUs represented by an original SUList) as input. The multiple heuristics may include the First-Fit heuristic 710, the Best-Fit heuristics (with total capacity 720, relative capacity 730, and critical capacity 740), and the Worst-Fit heuristics (with total capacity 750, relative capacity 760, and critical capacity 770), all of which perform incremental configuration when none of the existing SUs in the SG can support a given SI. In an alternative embodiment, the heuristics may be run sequentially in any order. Each of the heuristics produces an SUList_work (that is, SUList_FF, SUList_BF_TC, SUList_BF_RC, SUList_BF_CC, SUList_WF_TC, SUList_WF_WF_RC and SUList_WF_CC). The final SUList is the list with the least number of SUs; that is, the list with the minimal SUs added by the incremental configuration operations (block 780). Thus, the resources used for protecting services can be minimized. In the case of equality between at least two of the lists, one may chose the list of SUs with minimal total capacity or the list with maximal total capacity, depending on whether the design criteria emphasizes minimizing resources or on extendibility. If the size of the final SUList is the same as the size of the original SUList (block 790), it indicates that the input SG (represented by the original SUList) is valid and can protect the SIs without any additional SUs (block 791). Otherwise, the input SG needs to be reconfigured to include the additional SUs in the final SUList (block 792).

Applying the Heuristics to Different Redundancy Models:

In the above description, seven different heuristics are described and a solution for the SI protection problem is described that combines the results of the heuristics. The following describes how to apply the solution for the SI protection problem to different redundancy models, namely the N+M, N-Way, and N-Way-Active redundancy models considering the multiple assignments for the SIs and their distribution.

N+M Redundancy Model:

In the N+M redundancy model, N SUs support the active assignments and M SUs support the standby assignments. These N+M SUs allow at most one active and one standby assignment for each SI. In this case, the above-described heuristics are applied to a configuration with the N SUs that support the active assignments of the SIs considering the SU's active capacity. These N SUs are typically the first N SUs of the original SUList, assuming that the list orders the SUs according to their ranking (e.g., a preference). These first N SUs may have the same rank, which is higher than the other SUs that will be used as standby. If more than N SUs have equal ranks, there are a number of choices to split the SUs into the active and standby SU subsets (the method of splitting the SUs is not germane to the embodiments of the invention and, therefore, is not described herein). The above-described heuristics are also applied to a configuration with the M SUs that support the standby assignments of the SIs, considering the SU's standby capacity. These M SUs are typically the subsequent M SUs of the original SUList. The SG (containing the SUs) can protect the SIs if and only if the results are "Yes" for both N active SUs and M standby SUs. In one embodiment, the above-described incremental configuration can be applied to add one or more active SUs and/or one or more standby SUs.

Figure 8:
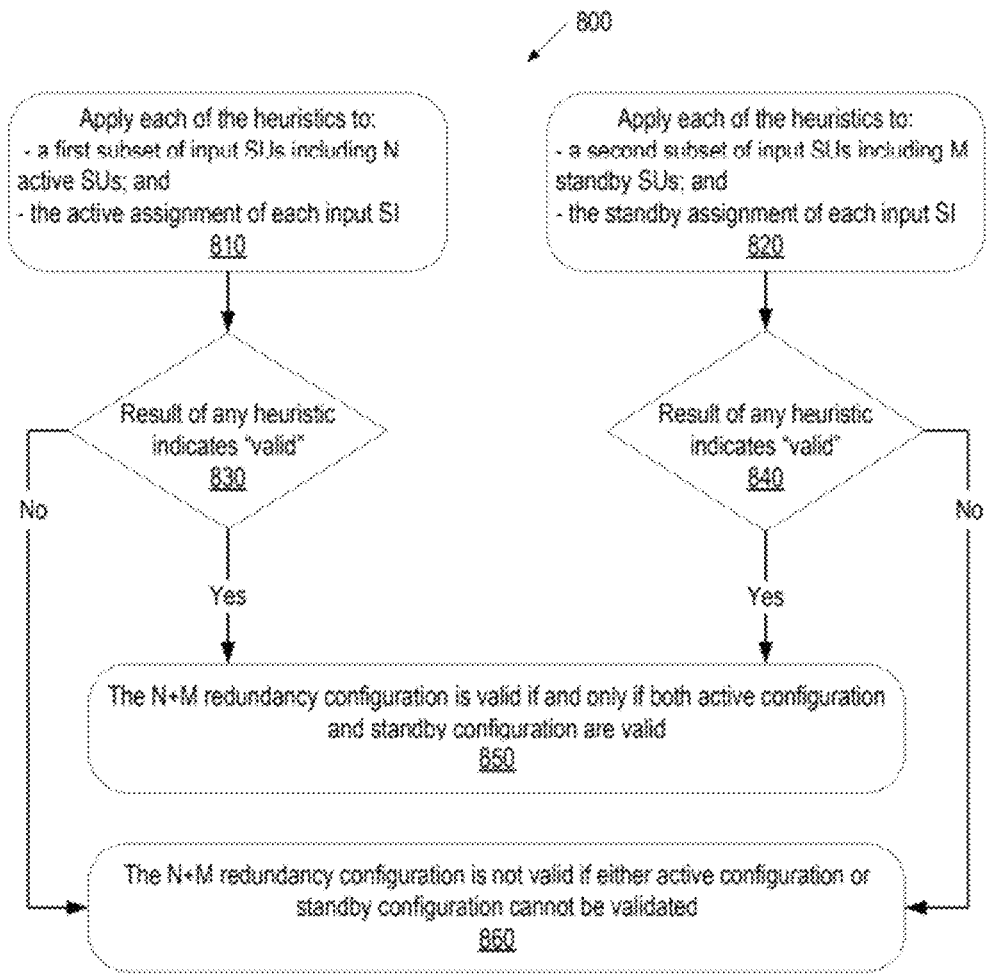
FIG. 8 is a flow diagram illustrating a method of validating an N+M redundancy model configuration according to one embodiment of the invention.

FIG. 8 is a flow diagram illustrating a method 800 for applying the heuristics to the N+M redundancy model according to embodiments of the invention. The method 800 may be performed by hardware (e.g., circuitry, dedicated logic, programmable logic, microcode, etc.), software (e.g., instructions run on a processing device), or a combination thereof. In one embodiment, the method 800 is performed by the computer system 200 of FIG. 2, which includes one or more server computers each of which may have the hardware shown in a computer system 1100 of FIG. 11.

Referring to FIG. 8, in one embodiment, the method 800 begins with the AMF service module 210 (of FIG. 2) performing a number of heuristics to validate an M+N redundancy configuration, which includes N active SUs and M standby SUs, for a given set of input SIs. Each SI in the input has one active assignment and one standby assignment. For each of the heuristics, the AMF service module 210 applies the heuristic to the input list of SIs and a first subset of the N SUs in the input considered for the active role, with each SU having an active capacity (block 810). For each of the heuristics, the AMF service module 210 also applies the heuristic to the input list of SIs and a second subset of M SUs from the input list considered for the standby role with each SU having a standby capacity, which may be different from the active capacity (block 820). When allocating the active assignment the N SUs are sorted based on their remaining active capacity, and for standby assignment the M SUs are sorted based on their remaining standby capacity. The operations of blocks 810 and 820 may be performed in parallel or sequentially in any given order. If any of the heuristics indicate that the configuration of N active SUs can support the active SI assignments and is therefore valid (block 830), and any of the heuristics indicate that the configuration of M standby SUs can support the standby SI assignments and is therefore also valid (block 840), the AMF service module 210 outputs a result indicating that the configuration, according to the N+M redundancy model is valid (block 850). It is noted that the heuristic that validates the N active SUs can be the same as or different from the heuristic that validates the M standby SUs. The configuration is not valid if either the N active SUs or the M standby SUs cannot be validated (block 860).

N-Way-Active Redundancy Model:

An SG configured according to the N-Way-Active redundancy model has N SUs which are allocated only as active. It has no SU allocated as standby. Furthermore, each of the SIs protected by this redundancy model may need to be allocated to more than one SU specified in the PreferredActiveAssignments attribute of the SI. In each of the above-described heuristics, each SI has only one assignment per SI, i.e. the heuristic proceeds after the first assignment of each SI. In order to handle multiple assignments, whenever a new SI is reached, the SI is allocated to multiple SUs before proceeding to the next SI. In addition, one SI can only be allocated to the same SU once. In one embodiment, the above-described incremental configuration can be applied to add one or more active SUs.

Figures 9, 10:
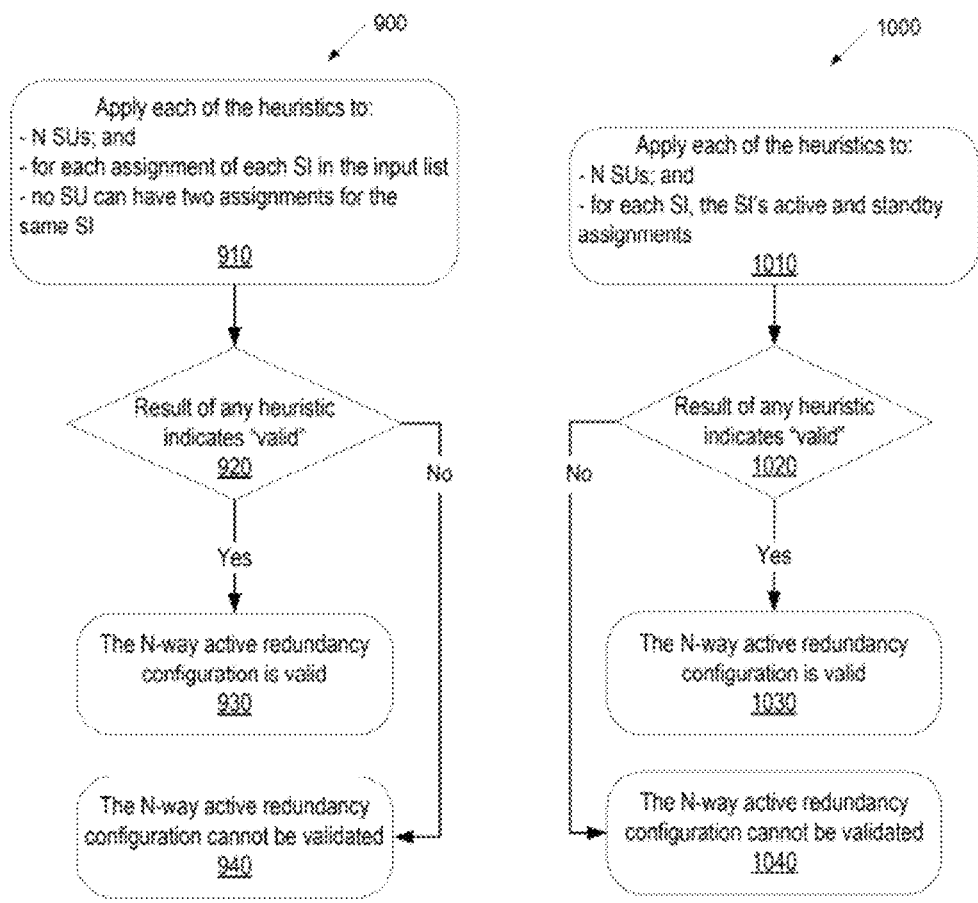
FIG. 9 is a flow diagram illustrating a method of validating an N-Way-Active redundancy model configuration according to one embodiment of the invention.
FIG. 10 is a flow diagram illustrating a method of validating an N-Way redundancy model configuration according to one embodiment of the invention.

FIG. 9 is a flow diagram illustrating a method 900 for applying the heuristics to the N-Way-Active redundancy model according to embodiments of the invention. The method 900 may be performed by hardware (e.g., circuitry, dedicated logic, programmable logic, microcode, etc.), software (e.g., instructions run on a processing device), or a combination thereof. In one embodiment, the method 900 is performed by the computer system 200 of FIG. 2, which includes one or more server computers, each of which may have the hardware shown in a computer system 1100 of FIG. 11.

Referring to FIG. 9, in one embodiment, the method 900 begins with the AMF service module 210 (of FIG. 2) performing a number of heuristics to validate an N-way-Active redundancy configuration of N active SUs for a given set of input SIs. Each of the SIs has one or more active assignments. For each of the heuristics, the AMF service module 210 applies the heuristic to N active SUs and the active assignments of each SI (block 910). Each assignment of the SI is treated as an individual SI by the First-Fit, Best-Fit and Worst-Fit heuristics described above, and assignments of the same SI are allocated to different SUs (i.e., no SU can have two assignments for the same SI). If all of the active assignments of an SI are successfully allocated, the heuristic is applied to the one or more active assignments of a next SI in the input. The heuristics in block 910 may be applied in parallel or sequentially in any given order. If any of the heuristics indicate that the configuration of N active SUs can support the input SIs (block 920), the configuration of the N SUs is valid according to the N-way-active redundancy model (block 930). If all of the heuristics indicate that the configuration of N active SUs cannot support the input SIs (block 920), the configuration of the N SUs cannot be validated (block 940).

N-Way Redundancy Model:

An SG configured according to the N-Way redundancy model contains N SUs, with each SU having a combination of active and standby assignments. However, each SI can be allocated as active to only one SU while it can be allocated as standby to several (specified in the PreferredStandbyAssignments attribute of the SI) SUs. The validation operation for this redundancy model is similar to that for the N-Way-Active redundancy model. The active capacity of the SUs is used for the single active assignment and the standby capacity of the SUs is used for the multiple standby assignments. The same SU cannot be re-allocated to the same SI, neither as standby nor as active. In one embodiment, the above-described incremental configuration can be applied to add one or more SUs.

FIG. 10 is a flow diagram illustrating a method 1000 for applying the heuristics to the N-Way redundancy model according to embodiments of the invention. The method 1000 may be performed by hardware (e.g., circuitry, dedicated logic, programmable logic, microcode, etc.), software (e.g., instructions run on a processing device), or a combination thereof. In one embodiment, the method 1000 is performed by the computer system 200 of FIG. 2, which includes one or more server computers, each of which may have the hardware shown in a computer system 1100 of FIG. 11.

Referring to FIG. 10, in one embodiment, the method 1000 begins with the AMF service module 210 (of FIG. 2) performing a number of heuristics to validate an N-way redundancy configuration of N SUs for a given set of input SIs. Each of the SIs has one active assignment and one or more standby assignments. For each of the heuristics, the AMF service module 210 applies the heuristic to the N SUs and the assignments (include the active assignment and the standby assignments) of each SI (block 1010). Each assignment of the SI is treated as an individual SI by the First-Fit, Best-Fit and Worst-Fit heuristics described above, and assignments (active as well as standby) of the same SI are allocated to different SUs. The active assignment is allocated against an SU's active capacity, while the standby assignment is allocated against the standby capacity. When allocating the active assignment the SUs are sorted based on their remaining active capacity, and for standby assignments based on their remaining standby capacity. If all of the assignments of an SI are successfully allocated, the heuristic is applied to the assignments of a next SI in the input SIs. The heuristics in block 1010 may be applied in parallel or sequentially in any given order. If any of the heuristics indicate that the configuration of N SUs can support the input SIs (block 1020), the configuration is valid according to the N-way redundancy model (block 1030). If all of the heuristics indicate that the configuration of N SUs cannot support the input SIs (block 1020), the configuration cannot be validated (block 1040).

Incremental Configuration for the Redundancy Models:

In the case of the active part of the N+M and N-Way redundancy models only one SU should be added. For the N-Way-Active redundancy model and the standby part of the N-Way, the number is equal to the number of remaining active/standby assignments of the SI in question, i.e., if Q assignments of an SI have already taken place before the failing point, the number of additional SUs is equal to PreferredActiveAssignments−Q or PreferredStandbyAssignments−Q.

Figure 11:
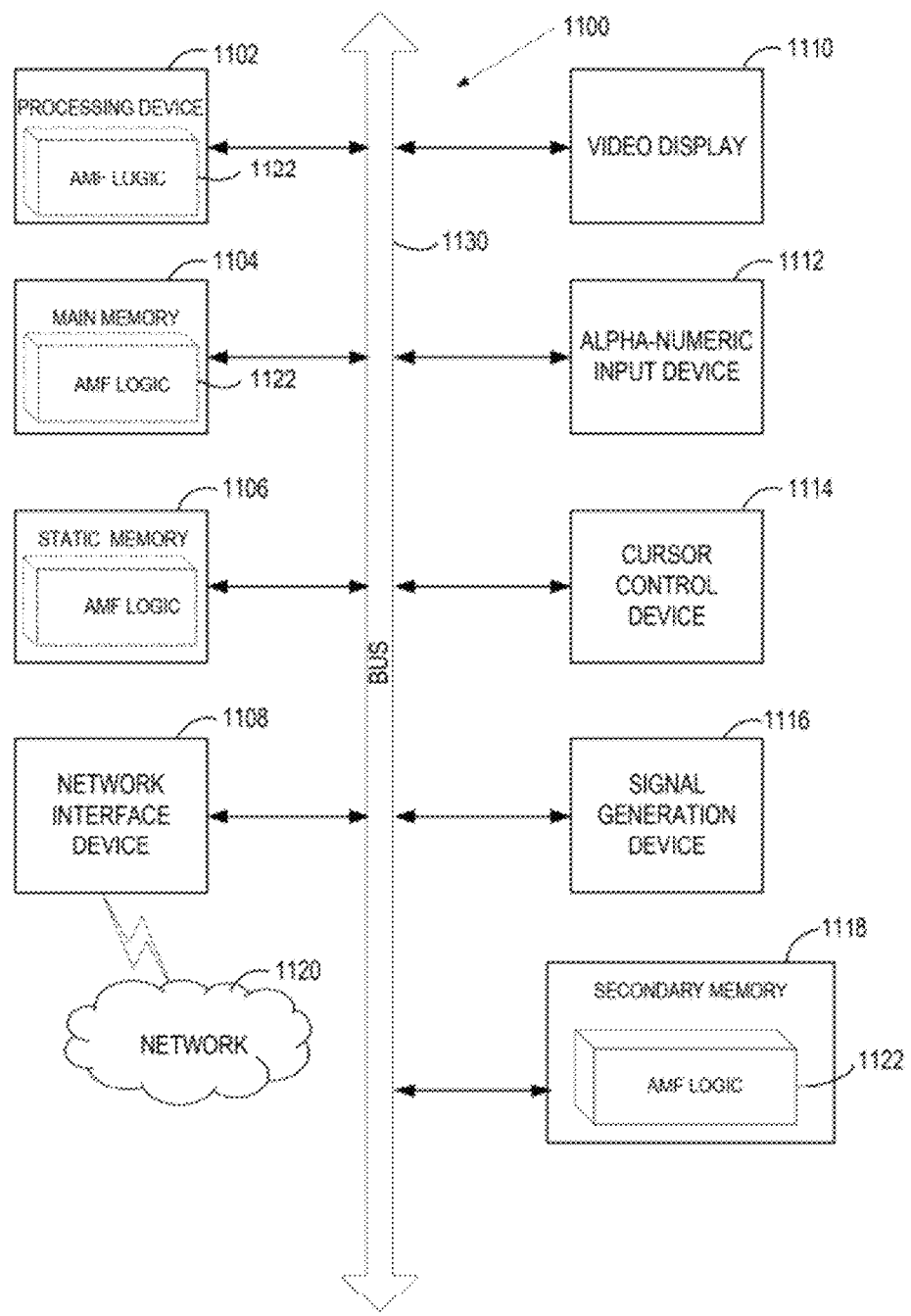
FIG. 11 illustrates a diagrammatic representation of a machine in the exemplary form of a computer system according to embodiments of the invention.

FIG. 11 illustrates a diagrammatic representation of a machine in the exemplary form of a computer system 1100 within which a set of instructions, for causing the machine to perform any one or more of the methodologies discussed herein, may be executed. The computer system 1100 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computer system 1100 represents the computer system 200 or one of the server computers constituting the computer system 200 of FIG. 2.

The exemplary computer system 1100 includes a processing device 1102 coupled to a computer readable storage medium, such as: a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1118 (e.g., a data storage device), which communicate with each other via a bus 1130. The computer readable storage medium may also include any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or any type of media suitable for storing electronic instructions.

The processing device 1102 represents one or more general-purpose processing devices such as a microprocessor, central processing unit (CPU), multicore systems, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. In one embodiment, the processing device 1102 is adapted to execute the AMF logic 1122 for performing the operations and steps of the AMF service module 210 of FIG. 2.

The computer system 1100 may further include a network interface device 1108. A part or all of the AMF logic 1122 may be transmitted or received over a network 1120 via the network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

In one embodiment, the AMF logic 1122 may be stored in the non-transitory computer readable storage medium of the secondary memory 1118 and/or the static memory 1106. The AMF logic 1122 may also reside, completely or at least partially, within the main memory 1104 and/or within the processing device 1102 during execution thereof by the computer system 1100. The AMF logic 1122 may be stored in the same computer system 1100 or distributed on multiple computer systems 1100.

The term "computer readable storage medium" should be taken to include a single medium or multiple media (e.g., a centralized or distributed database, and/or associated caches and servers) that store the one or more sets of instructions.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer system programmed to validate a configuration, according to which a plurality of Service Instances (SIs) are to be allocated to a list of Service Units (SUs) for protection of services represented by the SIs, the SUs representing a collection of hardware and software components capable of providing the services, wherein each of the SUs has k capacities $<c_1, \ldots, c_k>$ for each of k component service types (CSTypes), k being an integer greater than one, and wherein each of the SIs has k required capacities $<r_1, \ldots, r_k>$ for each of the k CSTypes, the method comprising the steps of:

applying, by the computer system, a set of one or more heuristics to determine whether, for each of the SIs, the SI can be allocated to one of the SUs whose capacities $<c_1, \ldots, c_k>$ support the required capacities $<r_1, \ldots, r_k>$ of the SI, the heuristics including at least a order-based heuristic, wherein, for the order-based heuristic, the step of applying further comprises the steps of:

determining a set of one or more of the k CSTypes to be used as a sorting criterion; and sorting the SUs in the list for each of the SIs based on the determined set of CSTypes;

walking the list of SUs in order, to find a first of the SUs that supports a current one of the SIs to be allocated, wherein, for each CSType, the capacity of the first SU is greater than or equal to the required capacity of the current SI of that CSType;

if the first SU is found in the list of SUs, updating the capacities of the first SU to remove the required capacities of the current SI from the provided capacities of the first SU; and if none of the SUs in the list of SUs can support the current SI, indicating that the configuration is not validated; and in response to a result that at least one of the heuristics in the set indicates the SUs can support all of the SIs, generating a result indicating that the configuration is valid.

2. The method of claim 1, wherein the set of heuristics include multiple subsets of the heuristics and each of the multiple subsets includes one or more of the heuristics, the step of applying further comprising the steps of: applying a first of the subsets of the heuristics to allocate the SUs to the SIs, wherein the first subset of the heuristics maintain the order of the SUs in the list of SUs for all of the SIs; applying a second of the subsets of the heuristics to allocate the SUs to the SIs, wherein the second subset of the heuristics re-sort the SUs for each of the SIs in an increasing order of the capacities of the SUs; applying a third of the subsets of the heuristics to allocate the SUs to the SIs, wherein the third subset of the heuristics re-sort the SUs for each of the SIs in a decreasing order of the capacities of the SUs; and in response to the result that one of the heuristics in the first subset, the second subset and the third subset indicates the SUs can support all of the SIs, generating a result indicating that the configuration is valid.

3. The method of claim 1, wherein the set of heuristics include multiple subsets of the heuristics and each of the multiple subsets includes one or more of the heuristics, the step of applying further comprising the steps of: applying a first of the subsets of the heuristics to allocate the SUs to the SIs, wherein the first subset of the heuristics re-sort the SUs for each of the SIs and determine, for each of the SIs, one of the CSTypes to sort the SUs, wherein the CSType for one of the SIs is different from the CSType for another of the SIs; applying a second of the subsets of the heuristics to allocate the SUs to the SIs, wherein the second subset of the heuristics re-sort the SUs for each of the SIs and calculate, for each of the SIs, a sum of the capacities of all of the CSTypes to sort the SUs; and in response to the result that one of the heuristics in the first subset and the second subset indicates the SUs can support all of the SIs, generating a result indicating that the configuration is valid.

4. The method of claim 1, wherein the set of heuristics include a first fit heuristic, the step of applying further comprising the steps of:

walking the list of SUs to find the first SU that supports the current SI, wherein the order of the SUs in the list of SUs remains fixed and no re-sorting is performed for subsequent SIs of the SIs.

5. The method of claim 1, wherein the order-based heuristic uses total capacity as the sorting criterion, the step of sorting further comprising the steps of:

for each of the SUs, summing the k CSTypes of its capacities to obtain the total capacity of the SU; and sorting the SUs based on an increasing or decreasing order of the total capacity of the SUs.

6. The method of claim 1, wherein the order-based heuristic uses relative capacity as the sorting criterion, the step of sorting further comprising the steps of:

identifying a largest value in the required capacities of the current SI, the identified largest value having a given CSType of the CSTypes; and sorting the SUs based on an increasing or decreasing order of the given CSType of the capacities of the SUs.

7. The method of claim 1, wherein the order-based heuristic uses critical capacity as the sorting criterion, the step of sorting further comprising the steps of:

performing vector additions on the capacities of all of the SUs to obtain $<tc_i, \ldots, tc_k>$;

for the current SI, calculating $(r_i/tc_i)$, for $i=1, \ldots, k$;

identifying a most critical CSType of the current SI, the most critical CSType being the CSType of $(r_i/tc_i)$ that has a largest value among $i=1, \ldots, k$; and sorting the SUs based on an increasing or decreasing order of the most critical CSType of the capacities of the SUs.

8. The method of claim 1, wherein the step of indicating that the configuration is not validated further comprises the steps of:

for the current SI that cannot be allocated, identifying a first of the SUs in an original copy of the list that supports the current SI, wherein the original copy of the list has not been updated with respect to the capacities allocated to the SIs; and adding an additional SU to the list to thereby increase the capacities available to the SIs, the additional SU having the same capacities as the first SU identified in the original copy of the list.

9. The method of claim 8, further comprising the steps of:

obtaining a plurality of resulting lists, each of the resulting lists indicating a total number of SUs resulted from each of the heuristics; and selecting one of the resulting lists that has a minimum number of SUs as a final configuration.

10. The method of claim 1, wherein the step of applying further comprises the steps of: applying each of the heuristics to N number (N) of the SUs designated to be active and each of the SIs having an active assignment to obtain a first result; applying each of the heuristics to M number (M) of the SUs designated to be standby and each of the SIs having a standby assignment to obtain a second result; in response to a determination that the first result and the second result both indicates that the configuration is valid, generating a final result indicating that the configuration is valid.

11. The method of claim 1, wherein the step of applying further comprises the steps of: applying each of the heuristics to N number (N) of the SUs designated to be active and the SIs that each have one or more active assignments, wherein, for each of the SIs, the method further comprises the steps of: allocating a different one of the N SUs to each of the active assignments of the SI; and after allocation of all of the active assignments of the SI, allocating the N SUs to the active assignments of a next one of the SIs.

12. The method of claim 1, wherein the step of applying further comprises the steps of: applying each of the heuristics to N number (N) of the SUs and the SIs that each have multiple assignments including an active assignment and one or more standby assignments, wherein, for each of the SIs, the method further comprises the steps of: allocating a different one of the N SUs to each of the multiple assignments of the SI; and after allocation of all of the multiple assignments of the SI, allocating the N SUs to the assignments of a next one of the SIs.

13. A computer system adapted to validate a configuration, according to which a plurality of Service Instances (SIs) are to be allocated to a list of Service Units (SUs) for protection of service represented by the SIs, each of the SUs representing a collection hardware and software components capable of providing the services, wherein each of the SUs has k capacities $<c_1, \ldots, c_k>$ for each of k component service types (CSTypes), k being an integer greater than one, and wherein each of the SIs has k required capacities $<r_1, \ldots, r_k>$ for each of the k CSTypes, the computer system comprising:

a processor coupled to a non-transitory computer readable storage medium, the non-transitory computer readable storage medium having stored therein an availability management framework (AMF) service module adapted to:

apply a set of one or more heuristics to determine whether, for each of the SIs, the SI can be allocated to one of the SUs whose capacities $<c_1, \ldots, c_k>$ support the required capacities $<r_1, \ldots, r_k>$ of the SI, the heuristics including at least an order-based heuristic, the AMF service module further adapted to: determine a set of one or more of the k CSTypes to be used as a sorting criterion and sort the SUs in the list for each of the SIs based on the determined set of CSTypes;

walk the list of SUs in order, to find a first of the SUs that supports a current one of the SIs to be allocated, wherein, for each CSType, the capacity of the first SU is greater than or equal to the required capacity of the current SI of that CSType;

if the first SU is found in the list of SUs, update the capacities of the first SU to remove the required capacities of the current SI from the provided capacities of the first SU; and if none of the SUs in the list of SUs can support the current SI, indicate that the configuration is not validated; and in response to a result of at least one of the heuristics in the set that the SUs can support all of the SIs, generate a result indicating that the configuration is valid.

14. The computer system of claim 13, wherein the set of heuristics include multiple subsets of the heuristics and each of the multiple subsets includes one or more of the heuristics, the AMF service module further adapted to: apply a first of the subsets of the heuristics to allocate the SUs to the SIs, wherein the first subset of the heuristics maintain the order of the SUs in the list of SUs for all of the SIs; apply a second of the subsets of the heuristics to allocate the SUs to the SIs, wherein the second subset of the heuristics re-sort the SUs for each of the SIs in an increasing order of the capacities of the SUs; and apply a third of the subsets of the heuristics to allocate the SUs to the SIs, wherein the third subset of the heuristics re-sort the SUs for each of the SIs in a decreasing order of the capacities of the SUs, wherein, in response to the result that one of the heuristics in the first subset, the second subset and the third subset indicates the SUs can support all of the SIs, the AMF service module is adapted to generate a result indicating that the configuration is valid.

15. The computer system of claim 13, wherein the order-based heuristic uses relative capacity as the sorting criterion, the AMF service module is further adapted to:

identify a largest value in the required capacities of the current SI, the identified largest value having a given CSType of the CSTypes; and sort the SUs based on an increasing or decreasing order of the given CSType of the capacities of the SUs.

16. The computer system of claim 13, wherein the order-based heuristic uses critical capacity as the sorting criterion, the AMF service module is further adapted to:

perform vector additions on the capacities of all of the SUs to obtain $<tc_i, \ldots, tc_k>$;

for the current SI, calculate $(r_i/tc_i)$, for $i=1, \ldots, k$;

identify a most critical CSType of the current SI, the most critical CSType being the CSType of $(r_i/tc_i)$ that has a largest value among $i=1, \ldots, k$; and sort the SUs based on an increasing or decreasing order of the most critical CSType of the capacities of the SUs.

17. A non-transitory computer readable storage medium including instructions that, when executed by a computer system, cause the computer system to perform a method of validating a configuration, according to which a plurality of Service Instances (SIs) are to be allocated to a list of Service Units (SUs) for protection of service represented by the SIs, the SUs representing a collection of hardware and software components capable of providing the services, wherein each of the SUs has k capacities $<c_1, \ldots, c_k>$ for each of k component service types (CSTypes), k being an integer greater than one, and wherein each of the SIs has k required capacities $<r_1, \ldots, r_k>$ for each of the k CSTypes, the method comprising the steps of:

applying a set of one or more heuristics to determine whether, for each of the SIs, the SI can be allocated to one of the SUs whose capacities $<c_i, \ldots, c_k>$ support the required capacities $<r_1, \ldots, r_k>$ of the SI, the heuristics including at least an order-based heuristic, wherein, or the order-based heuristic, the step of applying further comprises the steps of:

determining a set of one or more of the k CSTypes to be used as a sorting criterion; and sorting the SUs in the list for each of the SIs based on the determined set of CSTypes;

walking the list of SUs in order, to find a first of the SUs that supports a current one of the SIs to be allocated, wherein, for each CSType, the capacity of the first SU is greater than or equal to the required capacity of the current SI of that CSType;

if the first SU is found in the list of SUs, updating the capacities of the first SU to remove the required capacities of the current SI from the provided capacities of the first SU; and if none of the SUs in the list of SUs can support the current SI, indicating that the configuration is not validated; and in response to a result that at least one of the heuristics in the set indicates the SUs can support all of the SIs, generating a result indicating that the configuration is valid.

18. The non-transitory computer readable storage medium of claim 17, wherein the set of heuristics include multiple subsets of the heuristics and each of the multiple subsets includes one or more of the heuristics, the step of applying further comprising the steps of: applying a first of the subsets of the heuristics to allocate the SUs to the SIs, wherein the first subset of the heuristics maintain the order of the SUs in the list of SUs for all of the SIs; applying a second of the subsets of the heuristics to allocate the SUs to the SIs, wherein the second subset of the heuristics re-sort the SUs for each of the SIs in an increasing order of the capacities of the SUs; applying a third of the subsets of the heuristics to allocate the SUs to the SIs, wherein the third subset of the heuristics re-sort the SUs for each of the SIs in a decreasing order of the capacities of the SUs; and in response to the result that one of the heuristics in the first subset, the second subset and the third subset indicates the SUs can support all of the SIs, generating a result indicating that the configuration is valid.

19. The non-transitory computer readable storage medium of claim 17, wherein the order-based heuristic uses relative capacity as the sorting criterion, the step of sorting further comprising the steps of:
identifying a largest value in the required capacities of the current SI, the identified largest value having a given CSType of the CSTypes; and
sorting the SUs based on an increasing or decreasing order of the given CSType of the capacities of the SUs.

20. The non-transitory computer readable storage medium of claim 17, wherein the order-based heuristic uses critical capacity as the sorting criterion, the step of sorting further comprising the steps of:
performing vector additions on the capacities of all of the SUs to obtain $\langle tc_i, \ldots, tc_k \rangle$;
for the current SI, calculating $(r_i/tc_i)$, for $i=1, \ldots, k$;
identifying a most critical CSType of the current SI, the most critical CSType being the CSType of $(r_i/tc_i)$ that has a largest value among $i=1, \ldots, k$; and
sorting the SUs based on an increasing or decreasing order of the most critical CSType of the capacities of the SUs.

* * * * *

UNITED STATES PATENT AND TRADEMARK OFFICE
CERTIFICATE OF CORRECTION

PATENT NO. : 8,584,090 B2  
APPLICATION NO. : 13/083243  
DATED : November 12, 2013  
INVENTOR(S) : Salehi et al.

It is certified that error appears in the above-identified patent and that said Letters Patent is hereby corrected as shown below:

In the Drawings

In Fig. 7A, Sheet 7 of 11, in Box "702", Line 1, delete "Best Ft" and insert -- Best Fit --, therefor.

In the Specifications

In Column 6, Line 25, delete "$\{(r_1^j, \ldots, r_k^j)\}$" and insert -- $\langle r_1^j, \ldots, r_k^j \rangle$ --, therefor.

In Column 9, Line 19, delete "$t = \arg\max(\{(r_1^j, \ldots, r_k^j)\})$," and insert -- $t = \arg\max(\langle r_1^j, \ldots, r_k^j \rangle)$, --, therefor.

In Column 9, Line 55, delete "$\{r_1^j, \ldots, r_1^j\}$," and insert -- $\langle r_1^j, \ldots, r_k^j \rangle$, --, therefor.

In Column 9, Line 56, delete "$t = \arg\max(r_1^j/tc_1, \ldots, r_k^j/tc_k))$." and insert -- $t = \arg\max(r_1^j/tc_1, \ldots, r_k^j/tc_k)$. --, therefor.

In Column 9, Line 66, delete "require" and insert -- required --, therefor.

In Column 14, Line 3, delete "configuration," and insert -- configuration --, therefor.

Signed and Sealed this  
Sixth Day of May, 2014

Michelle K. Lee  
*Deputy Director of the United States Patent and Trademark Office*